(12) United States Patent
Jack

(10) Patent No.: US 6,676,891 B1
(45) Date of Patent: Jan. 13, 2004

(54) METHOD OF PRODUCING AN ARMATURE SEGMENT OF AN ELECTRICAL MACHINE

(75) Inventor: Alan G. Jack, Hexham (GB)

(73) Assignee: Höganäs AB, Höganäs (SE)

( * ) Notice: Subject to any disclaimer, the term of this patent is extended or adjusted under 35 U.S.C. 154(b) by 59 days.

(21) Appl. No.: 10/031,697

(22) PCT Filed: Jul. 28, 2000

(86) PCT No.: PCT/SE00/01521

§ 371 (c)(1),
(2), (4) Date: Jan. 23, 2002

(87) PCT Pub. No.: WO01/12365

PCT Pub. Date: Feb. 22, 2001

(30) Foreign Application Priority Data

Jul. 29, 1999 (SE) ................................. 9902809

(51) Int. Cl.⁷ .................................. B22F 3/02
(52) U.S. Cl. ................................. 419/5; 419/8
(58) Field of Search ......................... 419/5, 8

(56) References Cited

U.S. PATENT DOCUMENTS 4,150,927 A     4/1979   Steingroever
5,221,503 A     6/1993   Ward et al.
5,722,032 A     2/1998   Gay
6,300,702 B1 *  10/2001  Jack et al. ............... 310/216
6,472,792 B1 *  10/2002  Jack et al. ............... 310/254

FOREIGN PATENT DOCUMENTS

GB    1457 504      12/1976
SE    9501500 A     5/1995

* cited by examiner

Primary Examiner—Daniel J. Jenkins
(74) Attorney, Agent, or Firm—Burns, Doane, Swecker & Mathis, L.L.P.

(57) ABSTRACT

An armature segment of an electrical machine includes a coil and a core section. A method of producing such a segment comprises the steps of tightly winding the coil, providing a compaction die having a cavity for shaping the tightly wound coil, introducing the tightly wound coil into the compaction die and compacting the coil therein so as to reduce the volume occupied by the coil, providing a compression-moulding die having a moulding cavity, positioning the compacted coil in the moulding cavity of the compression die, filling the moulding cavity with insulated ferromagnetic particles, and compressing the insulated ferromagnetic particles in the moulding cavity so as to form the armature segment as a single-piece unit including the core section and the compacted coil.

20 Claims, 2 Drawing Sheets

METHOD OF PRODUCING AN ARMATURE SEGMENT OF AN ELECTRICAL MACHINE

TECHNICAL FIELD

The present invention generally is related to electrical machines, especially motors, and more precisely to a method of producing an armature segment of an electrical machine, which armature segment includes a coil and a core section.

BACKGROUND OF THE INVENTION AND THE PRIOR ART

Electrical machines work by the interaction of magnetic flux and current. At operating limits the magnetic flux is limited by saturation of the soft magnetic material and the current by the temperature resulting from ohmic heating. If more space is provided for conductors to reduce current densities and hence ohmic heating, the magnetic flux is also reduced and vice versa if more soft magnetic material is included the flux is increased but the conductor area is reduced and ohmic heating increased.

In most machines the conductors are contained in slots. It is necessary to semi-close the slots to obtain a smooth torque output and the result is that placing the windings in the slots is a difficult task which results in a poor ratio of conductor area to slot area. Ratios in the region of 50% are considered good. This poor ratio is bad for two reasons, firstly space is wasted which could be used for conductor or soft magnetic material and secondly the space in the slot will act as a thermal barrier increasing the temperature for a given ohmic loss.

By integrating the coils of an armature in the body thereof, it should be possible to increase the ratio of conductor area to slot area in other applications, it is known to integrate a coil into a body made of compressed metal powder, Thus, SE-A-9501500 discloses a magneto-strictive sensor having a housing made of metal powder and a sensing coil integrated therein.

SUMMARY

An object of this invention is to provide an armature, preferably a stator, for an electrical machine which armature has a better ratio of conductor area to slot area than armatures in the prior art.

A method of producing an armature segment of an electrical machine, which armature segment includes a coil add a core section in accordance with the present invention is characterised by the features specified in the appended claim 1. Preferred embodiments of that method are defined in the dependent claims.

Thus, this invention is concerned with first producing tightly wound coils. Then each tightly wound coil is placed in a die where it is compacted for shaping the tightly wound coil so that the cross-sectional area of the tightly wound coil is reduced. Preferably, this means that the cross-sectional shape of each wire of the coil is deformed toward a hexagonal shape. Thereafter, the compacted coil is positioned in a die for compaction of insulated iron powder to form an integrated coil and core unit. The armature of the machine is then assembled from a number of these units.

The coils being produced away from the geometric difficulties of insertion into the slots can have a far higher ratio of copper to slot area; using machine winding 70% is easily achieved. By the further step of compressing the coils in a die 81% can be achieved which is getting close to the theoretical maximum (which is fixed by the need for insulation around the conductors).

The result of this high ratio of conductor to slot area is a major reduction in coil resistance and excellent thermal conduction properties. At the same time, these coils may easily be produced using simple bobbin winding technique using fully automated techniques which are not expensive to implement.

The compaction of the insulated iron powder with the previously compacted coil produces a finished component, thereafter only requiring a heat treatment before assembly with the other components. Another benefit of the compaction is excellent thermal contact between the core and the coil allowing high currents densities to be used and higher output to be achieved from the same material.

DESCRIPTION OF THE PREFERRED EMBODIMENTS

Figure 1:
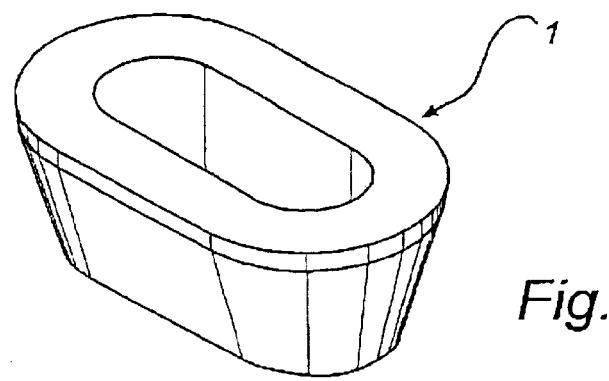
FIG. 1 is a perspective view of a pre-compacted coil used in the method according to the present invention.

A coil 1 illustrated in FIG. 1 is made of copper wire having a surface layer of an insulation material. The copper wire is wound helically in several turns forming the multi-layered winding or coil 1.

Figure 2:
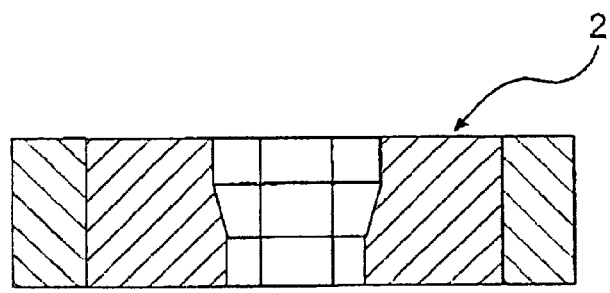
FIG. 2 is a cross-sectional view of a die used for pre-compaction of the coil before compression thereof with a ferromagnetic metal powder.
Figure 3:
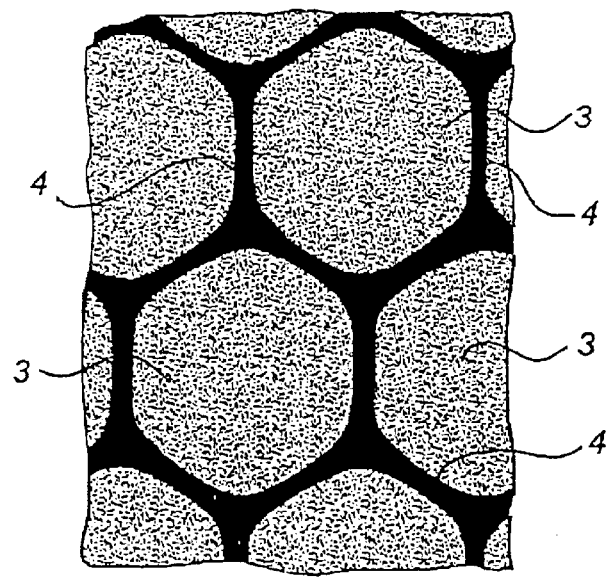
FIG. 3 is a cross-sectional view of a part of the coil of FIG. 1 resulting from the compacting using the die of FIG. 2.

In order to increase the conductor to slot ratio, the wire turns of the coil 1 should be placed in contact with each other. This is achieved by compressing the coil 1 in a die 2 as shown in FIG. 2, such that any spring-back effect of the coil wire is minimised. By the compression made in the die 2, each turn of the coil 1 contacts every neighbour turn thereof and preferably has a cross-sectional shape which is deformed from circular towards a hexagonal shape, as shown in FIG. 3, giving the best possible conductor to slot ratio. FIG. 3 illustrates a plurality of wires 3 and the insulation 4 thereof in cross-section.

Figure 4:
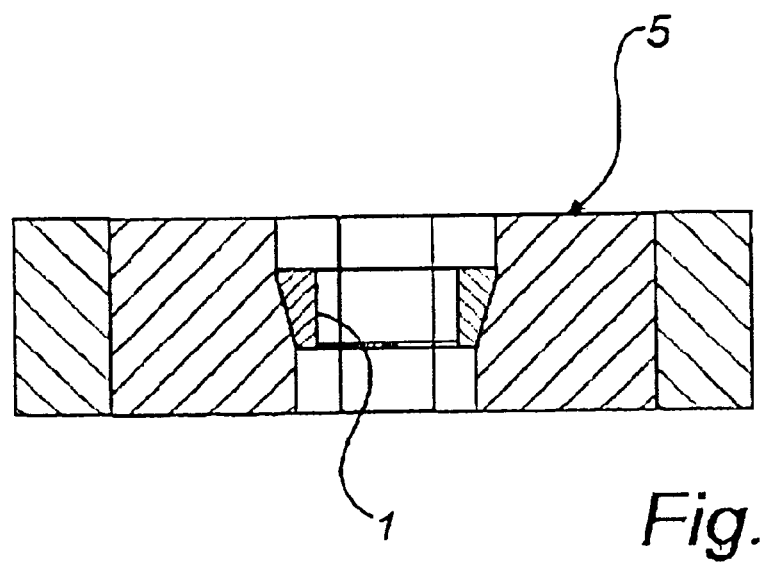
FIG. 4 is a cross-sectional view of a compression die showing the compacted coil positioned therein.

The compressed coil 1 is then removed from the compaction die 2 and positioned in a compression-moulding die 5 shown in cross-section in FIG. 4. More precisely, the compacted coil 1 is positioned in the moulding cavity of the die 5 in contact with the inner surface thereof. Thereafter, insulated ferromagnetic particles are filled into the moulding cavity of the die 5 and are compressed so as to form an armature segment, shown in FIG. 5, as a single-piece unit 6 including a core section 7 and a compacted coil 1.

Figure 5:
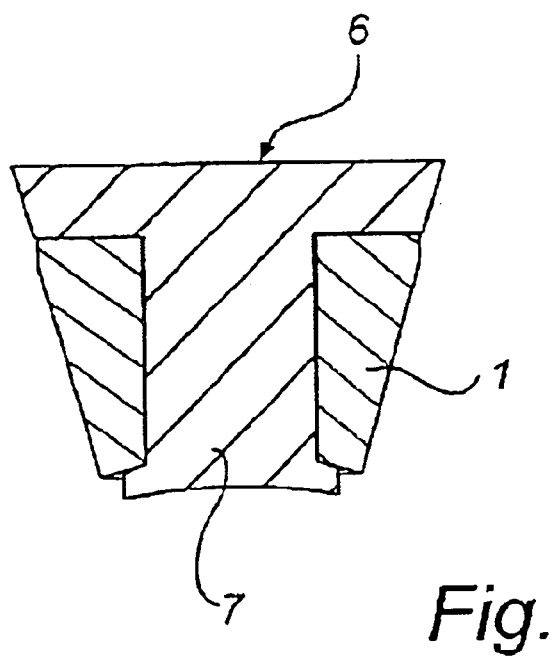
FIG. 5 is a cross-sectional view, taken in a plane normal to the planes of FIGS. 2 and 4, of a co-compressed coil and core unit forming an armature segment according to the invention.

Then, the single-piece armature segment 6 having the cross-sectional form shown in FIG. 5, is removed from the die 5 and is heat-treated.

Ultimately, a plurality of single-piece armature segments may be assembled into a complete armature.

It is obvious to the man skilled in the art that several modifications are possible without departing from the spirit of the present invention.

As an example, part of the compaction die 2 may also be used as part of the compression die 5.

What is claimed is:

1. A method of producing an armature segment of an electrical machine, which armature segment includes a coil and a core section, the method comprising the steps of tightly winding the coil;

providing a compaction die having a cavity for shaping the tightly wound coil;

introducing the tightly wound coil into the compaction die and compacting the coil therein so as to reduce a volume occupied by the coil;

providing a compression-molding die having a molding cavity;

positioning the compacted coil in the molding cavity of the compression die;

filling the molding cavity with insulated ferromagnetic particles; and compressing the insulated ferromagnetic particles in the molding cavity so as to form the armature segment as a single piece unit including the core section and the compacted coil.

2. A method as claimed in claim 1, wherein the tightly wound coil introduced into the compaction die is compacted so as to deform a cross-sectional area of individual wires of the coil towards a hexagonal shape.

3. A method as claimed in claim 1, wherein the compaction die partly is used as the compressing-molding die.

4. A method as claimed in claim 1, wherein the coil is positioned in the molding cavity of the compressing-molding die so as to form a surface layer of the armature segment.

5. A method as claimed in claim 1, wherein the coil is positioned in the molding cavity of the compression-molding die separated from surfaces thereof.

6. A method as claimed in claim 1, wherein the coil is preformed on a bobbin.

7. A method as claimed in claim 1, wherein the compressing is performed at an elevated temperature.

8. A method as claimed in claim 2, wherein the compaction die partly is used as the compressing-molding die.

9. A method as claimed in claim 2, wherein the coil is positioned in the molding cavity of the compressing-molding die so as to form a surface layer of the armature segment.

10. A method as claimed in claim 3, wherein the coil is positioned in the molding cavity of the compressing-molding die so as to form a surface layer of the armature segment.

11. A method as claimed in claim 8, wherein the coil is positioned in the molding cavity of the compressing-molding die so as to form a surface layer of the armature segment.

12. A method as claimed in claim 2, wherein the coil is preformed on a bobbin.

13. A method as claimed in claim 3, wherein the coil is preformed on a bobbin.

14. A method as claimed in claim 4, wherein the coil is preformed on a bobbin.

15. A method as claimed in claim 5, wherein the coil is preformed on a bobbin.

16. A method as claimed in claim 2, wherein the compressing is performed at an elevated temperature.

17. A method as claimed in claim 3, wherein the compressing is performed at an elevated temperature.

18. A method as claimed in claim 4, wherein the compressing is performed at an elevated temperature.

19. A method as claimed in claim 5, wherein the compressing is performed at an elevated temperature.

20. A method as claimed in claim 6, wherein the compressing is performed at an elevated temperature.

* * * * *